April 3, 1934. E. P. STENGER ET AL 1,953,899
MINING MACHINE BIT AND HOLDER
Filed Nov. 16, 1932
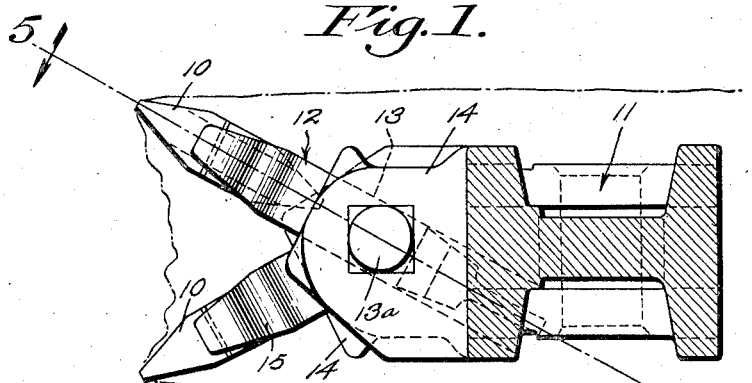
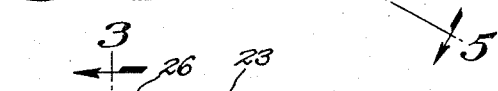
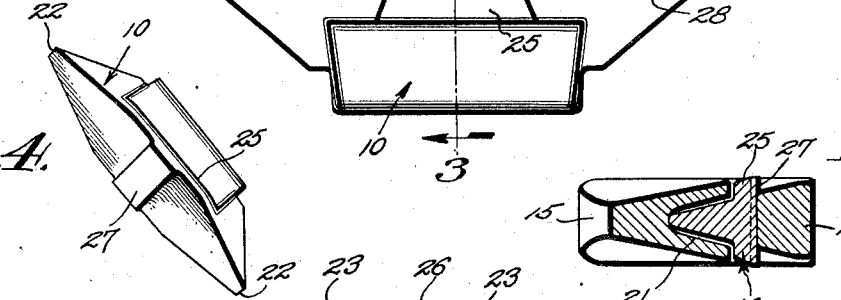
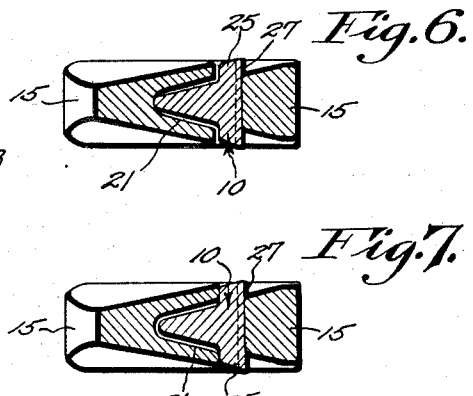
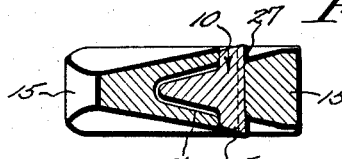
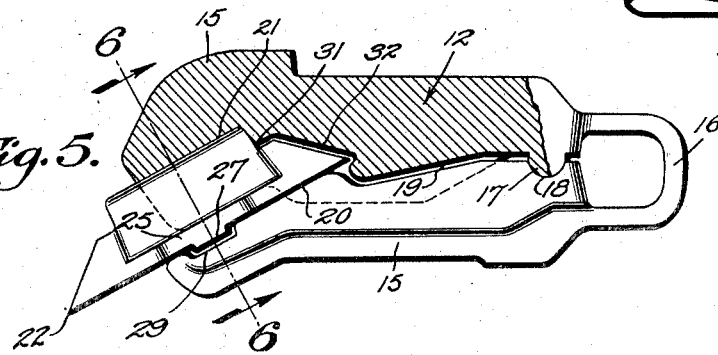
INVENTORS
Edwin P. Stenger
Armin O. Bruestle
BY
Wood & Wood ATTORNEYS Patented Apr. 3, 1934

1,953,899

UNITED STATES PATENT OFFICE 1,953,899

MINING MACHINE BIT AND HOLDER

Edwin P. Stenger and Armin O. Bruestle, Cincinnati, Ohio, assignors to The Cincinnati Mine Machinery Company, Cincinnati, Ohio, a corporation of Ohio Application November 16, 1932, Serial No. 642,883

10 Claims. (Cl. 262—33)

This invention relates to mining machinery and is particularly directed to cutter bits or teeth. The type of mining machinery to which these bits or teeth are applied includes an endless chain removably carrying the teeth laterally and angularly disposed for making a wide cut in rock, coal etc. The angle of the teeth in the transverse plane is varied as to successive teeth to make a wide cut or kerf.

The present invention being primarily directed to the construction of the teeth or bits and their mounting, it is only necessary for the purpose of clearly describing and illustrating the same that reference be made to one link of the cutter chain. For a fuller disclosure and understanding of the mechanism and bits to which the present improvements are applied, attention is directed to that general type of mechanism holder and bit or cutter disclosed in Patent No. 1,795,804, issued to E. P. Stenger et al., March 10, 1931, and Patent No. 1,841,069 issued to E. P. Stenger January 12, 1932.

The disclosed type of cutter bits or teeth are mounted in holders which are inserted in the sockets of the chain links of the chain. The bits have been disclosed as conveniently reversible and removable inasmuch as they are subjected to extremely hard usage and constant replacement is necessary. Since the bits or teeth are relatively short and must be solidly mounted in the holder, one of the problems is the arrangement of the cutting edges for maximum efficiency. It is, therefore, an object of this invention to provide an improved cutter tooth or bit for use in a mining machine chain in which the cutting edges, at each end of the bit as extended beyond the holder, are arranged so as to amply clear the supporting end of the holder, whereby the entire half of the bit extended for use has its cutting edge fully clear of the bit holder for a maximum length of effective cutting edge and action.

It has also been found that, in this type of apparatus wherein the cutter bit or tooth is inserted between the jaws of a holder or clamp which has a definite most effective closed position of the jaws for accurate and efficient holding of the cutter bit, it is essential that the cutter bits or teeth be uniform as to thickness. Since the bits wear out rapidly due to unusual conditions of service, economy in production methods employed in the manufacture of the roughly formed elements is necessary and it is therefore of advantage to reduce operations by combining them.

For this reason it is another object of this invention to provide an improved cutter bit or tooth and method of producing the same in which the sharpened cutting edges are formed by machining off a flat side of the bit procuring the proper thickness to fit the jaws of the holder, which machining at the same time efficiently sharpens the bit.

It is a still further object of this invention to provide a drop forged cutter tooth and an improved method of forming the same in which the flash resulting from forging is so placed as to be conveniently removed in the single operation which reduces the bit or tooth to a predetermined thickness and at the same time sharpens it efficiently.

It is a still further object to provide additional support for the bit or tooth within the holder.

Other objects and further advantages will be more fully apparent from a description of the accompanying drawing, in which:

Figure 1 is a sectional view taken transversely of a length of cutter chain showing the angular relation of the bits relative to the length of chain and disclosing the arrangement of the cutting edges of the bits or teeth and their relation to the holders.

Figure 2 is a side view of a drop forged bit or tooth showing the drop forging prior to the machining operation.

Figure 3 is a sectional view taken on line 3—3, Figure 2, detailing the cross sectional contour of the bit.

Figure 4 is a perspective view of the bit after it has been sharpened and finished to the proper dimension.

Figure 5 is a sectional view taken on line 5—5, Figure 1, illustrating a holder and bit mounted therein, one jaw of the holder being shown in section for fully illustrating the bit in position.

Figure 6 is a sectional view taken on line 6—6, Figure 5, detailing the supported position of the cutter in the holder.

Figure 7 is a view taken similar to Figure 6, but showing a modified supported position of the bit in the holder.

As illustrated in Figure 1, the bits or cutter teeth 10 are carried in an endless chain 11 and are angularly arranged to extend beyond the sides of the chain for forming a cut of sufficient width. For convenience in replacement, the bits or teeth are insertable in holders 12, the holders in turn being fixed in sockets 13 in the chain, one in each link or lug 14 thereof by means of set screws 13ᵃ. Each lug of the chain includes a socket and the transverse angle of these sockets is varied to cut a kerf of sufficient width. The present invention is directed to the method of forming and the construction of the bit or tooth for an efficient mounting and cutting action in the holder and for this reason no further description of the chain or other apparatus beyond the holder is believed necessary.

The holder illustrated in this case is of the construction which is disclosed in the patents previously mentioned, particularly that to E. P. Stenger No. 1,841,069, issued January 12, 1932. The jaws 15 of this holder are formed in one piece and are initially disposed in extended form, the ends being subsequently bent or folded upon a narrow connecting strip 16 which is tempered to provide a spring action for urging the jaws to a particular position. The rear ends of the jaws adjacent the connecting strip are mounted for rocking movement on a cross lug 17 of semicircular form in one jaw lying in a cross groove 18 of semicircular form in the other jaw.

The bits 10 are drop forged in the present instance and are initially forged in the form illustrated in Figure 2. The bits may be machined from rolled stock of proper cross section if desired. In the present form they may be described as generally triangular in cross section and of sufficient length to permit reversal with suitable cutting extension from an intermediate holding or mounting portion.

One jaw of the holder fits within a longitudinal groove 19 in the opposite jaw and presents a substantially flat inner face 20 at its extreme end adapted to lie against the machined face of the bit. The portion of the other jaw adjacent this flat portion includes a longitudinally disposed V-shape notch 21 adapted to receive the triangular elongated bit, certain other clearances being provided for the bit when mounted between the jaws.

The ends of the bit are bevelled on each side and on the apex edge of the triangle to form a point 22 at each respective end. The base of each tooth as forged has a non-tapering sheared edge formation 23 extending entirely around the same, which may otherwise be known as the trimmed flash and is the result of the forging operation being caused by the parting or space between the forming dies.

The formation of the bit excluding the bevelled or tapered ends is inclusive of heavy supporting side flanges 25 (see Figures 6 and 7). The general cross sectional shape of the bit may be described as of T-shape along the central portion. In the form of mounting shown in Figure 6 the flanges 25 do not contact the jaw in which the bit is recessed. The inner edge of the element is seated in the base of the recess and the flat face of the other jaw lies flush against the flat or machined side of the tooth or bit.

In the form of mounting shown in Figure 7 the flanges 25 lie on the jaw along the edge of the recess and the apex or inner edge of the bit is clear of the base of the recess. The other jaw engages the bit in this form in the same manner as the first form.

At the intermediate portion of the flat side or base of the bit a cross groove 26 (see Figure 2) is provided in the forging and serves as the portion at which the bit may be clamped during machining and which is not machined.

When the bit is inserted in the holder as shown in Figure 5, the ends of the jaws of the holder should be spaced apart a definite predetermined amount in order to bring the flat inner face 20 of the particular jaw flush against the flat or base side of the tooth for preventing rocking of the bit or tooth such as would occur if the flush engagement were not accomplished. For this reason it is necessary that the bit be of a definite thickness and to accomplish this the flat side is machined down to the particular dimension. At the same time, this machining or milling operation is designed to accomplish removal of the flash and sharpening of the bit entirely around its base edges with the exception of the cross retaining rib 27. This sharpening occurs because the milling takes place to a suitable depth to remove the flash, the cut proceeding into the angular or receding side walls, thus providing sharp edges (see Figure 3).

The dot and dash lines 28 of Figure 2 illustrate the normal depth of the milling cut or dressing operation. The cross rib which is formed intermediate the length of the bit is adapted to fit within a cross groove 29 in the flat side of the jaw. The bit is inserted between the open jaws which are slightly spread by their normal spring action when the set screw 13ª is loosened. The jaws are clamped upon the bit, with the cross rib and groove registering, by tightening of the set screw. The ends of each bit at the apex side are notched as at 30 providing abutment shoulders engaging a cooperating shoulder 31 in the holders. The inwardly disposed end of the bit is disposed in a cleared portion 32 of the holder jaw so that the sharp edges of the bit are not destroyed at the inner end which is not in use but awaiting use upon reversal. The cleared position 32 also permits rigid clamping of bits after reversal, the used end of which may have become distorted in service.

Having described our invention, we claim:

1. As a new article of manufacture, a reversible cutter tooth of elongated form and triangular cross section, said tooth bevelled on both sides and the apex edge at each end to provide substantial points at each end in the plane of the base side and including side flanges along the base side widening the base side, said base side machined off to provide a cutting edge extending substantially entirely around the base side.

2. As a new article of manufacture, a cutter tooth of elongated form and triangular cross section, said tooth bevelled on both sides and the apex edge at the end to provide a substantial point and including side flanges along its base side widening the base side, said base side machined off to provide a sharpened edge extending substantially entirely around the base side.

3. A new article of manufacture, comprising, a drop forge cutting element which is of triangular cross section and elongated form, said element having its ends bevelled on two sides and along the apex edge, whereby the tips at each end are in the plane of the base side, said element including flanges along the side edges of the base for widening the base surface and thereby increasing the length of the cutting edge.

4. A new article of manufacture, comprising, a cutting element which is of triangular cross section and elongated form, said element including flanges along the side edges of the base providing a wider base surface and thereby increasing the length of the base edge which functions as the cutting edge.

5. In a mining machine, a holder comprising a pair of jaws, a reversible cutter tooth mounted in said jaws, said cutter tooth including a cutting edge extending substantially entirely around the edge of one side face thereof, and said side of sufficient width, whereby that portion of the cutting edge on the particular end of the tooth in use entirely clears the sides and end of the holder.

6. In a mining machine, a holder comprising a pair of jaws, a cutter tooth mounted in said jaws, said cutter tooth including a flat side and a cutting edge extending around one end, said cutting edge disposed clear of both jaws at the ends and sides of the jaws.

7. In a mining machine, a holder comprising a pair of jaws, a reversible cutter tooth mounted in said jaws, said cutter tooth including a cutting edge extending around a substantially flat side thereof, one of said jaws including a substantially flat portion engaging said flat side of the tooth, said cutting edge sharpened by machining the flat side of the tooth to a definite thickness for the tooth, said tooth mounted in the holder in position with at least half of the cutting edge clearing the holder.

8. A device of the class described, comprising, a holder having a pair of jaws, one of said jaws including a longitudinal groove on its inner side and the other of said jaws including a substantially flat surface adjacent said groove, a bit mounted within said groove and having a flat surface disposed against said flat surface of said jaw, said bit including longitudinal flanges engaged between the inner side of the grooved jaw, beyond the groove, and the flat surface of the other jaw.

9. A device of the class described, comprising, a holder having a pair of jaws, one of said jaws including a longitudinal groove on its inner side and the other of said jaws including a substantially flat surface adjacent said groove, a bit mounted within said groove and having a flat surface disposed against said flat surface of said jaw, said bit including longitudinal flanges extending outwardly beyond the jaws at each side, and the flat surface of said bit machined to provide a cutting edge extending around the projected and cleared sides and tip of said bit.

10. A bit for mining machine chains, comprising, an element having flanges along its side edges and a sharpened point and the side including said flanges and point machined to provide a cutting edge.

EDWIN P. STENGER.
ARMIN O. BRUESTLE.